(12) United States Patent
Sarkisian et al.

(10) Patent No.: US 11,001,073 B2
(45) Date of Patent: *May 11, 2021

(54) UV-CURABLE INKJET INKS

(71) Applicant: Hewlett-Packard Development Company, L.P., Spring, TX (US)

(72) Inventors: George Sarkisian, San Diego, CA (US); Zhang-Lin Zhou, San Diego, CA (US); Rodney David Stramel, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/617,325

(22) PCT Filed: Oct. 17, 2017

(86) PCT No.: PCT/US2017/057013
§ 371 (c)(1),
(2) Date: Nov. 26, 2019

(87) PCT Pub. No.: WO2019/078827
PCT Pub. Date: Apr. 25, 2019

(65) Prior Publication Data
US 2020/0148902 A1 May 14, 2020

(51) Int. Cl.
*C09D 11/101* (2014.01)
*B41M 5/00* (2006.01)
(Continued)

(52) U.S. Cl.
CPC .......... *B41J 2/2107* (2013.01); *B41M 5/0023* (2013.01); *C08G 18/0828* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,089,586 A * 2/1992 Piepho ............... C08G 18/4833
528/49
7,612,160 B2 * 11/2009 Nguyen-Kim ..... C08G 18/6795
424/401
(Continued)

FOREIGN PATENT DOCUMENTS

WO 2015113605 8/2015
WO WO-2015113605 A1 * 8/2015 ............ B41J 11/005
(Continued)

OTHER PUBLICATIONS

Anapurna RTR3200i LED High-speed 3.2 m roll-to-roll UV LED inkjet printer for indoor and outdoor prints in a six or a four color plus white configuration Datasheet, AGFA Graphics, www.agfagraphics.com, 2016, 8 pages.
(Continued)

*Primary Examiner* — Manish S Shah
(74) *Attorney, Agent, or Firm* — Thorpe North & Western LLP

(57) ABSTRACT

The present disclosure is drawn to UV-curable inkjet inks, fluid sets, and printing systems. An example UV-curable inkjet ink can include water, a photo-initiator, from 8 wt % to 25 wt % organic co-solvent, and from 2 wt % to 20 wt % of a polyurethane. The polyurethane can include a polymer strand including a polymer backbone having two ends terminating at first and second capping units. The polymer backbone can be formed of polymerized monomers including a diisocyanate and a reactive diol selected from an acrylate-containing diol or a methacrylate-containing diol. The first capping unit can include an acrylate-containing
(Continued)

monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol reacted with an isocyanate group of the diisocyanate. The second capping unit can include 3-(cyclohexylamino)-1-propanesulfonic acid or 2-(cyclohexylamino)ethanesulfonic acid reacted with an isocyanate group of the diisocyanate.

14 Claims, 1 Drawing Sheet

(51) Int. Cl.

| | | |
|---|---|---|
| *C09D 11/102* | (2014.01) | |
| *C09D 11/322* | (2014.01) | |
| *C09D 11/54* | (2014.01) | |
| *B41J 2/21* | (2006.01) | |
| *C08G 18/08* | (2006.01) | |
| *C08G 18/24* | (2006.01) | |
| *C08G 18/28* | (2006.01) | |
| *C08G 18/67* | (2006.01) | |
| *C08G 18/72* | (2006.01) | |
| *C08G 18/73* | (2006.01) | |
| *C08G 18/75* | (2006.01) | |
| *C08G 18/76* | (2006.01) | |
| *C08G 18/81* | (2006.01) | |

(52) U.S. Cl.
CPC ......... *C08G 18/246* (2013.01); *C08G 18/288* (2013.01); *C08G 18/673* (2013.01); *C08G 18/6715* (2013.01); *C08G 18/722* (2013.01); *C08G 18/73* (2013.01); *C08G 18/755* (2013.01); *C08G 18/758* (2013.01); *C08G 18/7671* (2013.01); *C08G 18/815* (2013.01); *C08G 18/8166* (2013.01); *C09D 11/101* (2013.01); *C09D 11/102* (2013.01); *C09D 11/322* (2013.01); *C09D 11/54* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/1608; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106

See application file for complete search history.

(56) References Cited

U.S. PATENT DOCUMENTS

| | | | |
|---|---|---|---|
| 8,186,822 B2 * | 5/2012 | Li | C09D 11/30 |
| | | | 347/100 |
| 8,939,568 B2 | 1/2015 | Stoeva et al. | |
| 9,090,734 B2 * | 7/2015 | Kraiter | B41J 2/2107 |
| 9,260,558 B2 * | 2/2016 | Van Oorschot | C08G 18/0866 |
| 10,640,599 B2 * | 5/2020 | Zhou | C08G 18/288 |
| 2006/0023044 A1 | 2/2006 | Bauer | |
| 2006/0128833 A1 | 6/2006 | Itoh et al. | |
| 2009/0169749 A1 | 7/2009 | Brust et al. | |
| 2012/0046378 A1 | 2/2012 | Sloan | |
| 2015/0247044 A1 * | 9/2015 | Brandstein | C09D 11/101 |
| | | | 347/20 |
| 2016/0200938 A1 * | 7/2016 | Berger | C09D 11/101 |
| | | | 428/423.4 |
| 2016/0304734 A1 * | 10/2016 | Feng | B41J 11/0015 |
| 2017/0009091 A1 | 1/2017 | Herlihy | |
| 2018/0179325 A1 * | 6/2018 | Chen | C09D 11/101 |

FOREIGN PATENT DOCUMENTS

| | | |
|---|---|---|
| WO | 2016068983 | 5/2016 |
| WO | 2017069729 | 4/2017 |

OTHER PUBLICATIONS

Nakajima et al,. Development of New Cationic UV Curable Inkjet Ink, No. 1 Sakura-machi, Hino-shi, Tokyo 191-8511, Japan, 4 pages.

New Generation of Water-Based Inks / Sign & Digital Graphics, Jun. 1, 2010, https://sdgmag.com/features/new-generation-water-based-inks, 4 pages.

International Search Report dated Oct. 17, 2017 for PCT/US2017/057013, Applicant Hewlett-Packard Development Company, L.P.

\* cited by examiner

UV-CURABLE INKJET INKS

BACKGROUND

There are several reasons that inkjet printing has become a popular way of recording images on various media surfaces. Some of these reasons include low printer noise, variable content recording, capability of high speed recording, and multi-color recording. Additionally, these advantages can be obtained at a relatively low price to consumers. Consumer demand can create pressure to develop inkjet printing systems and inks that can print on a wide variety of media quickly and with good image quality. However, in many cases it can be difficult to balance parameters such as printing speed, jettability of ink, image quality, image durability, and so on.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
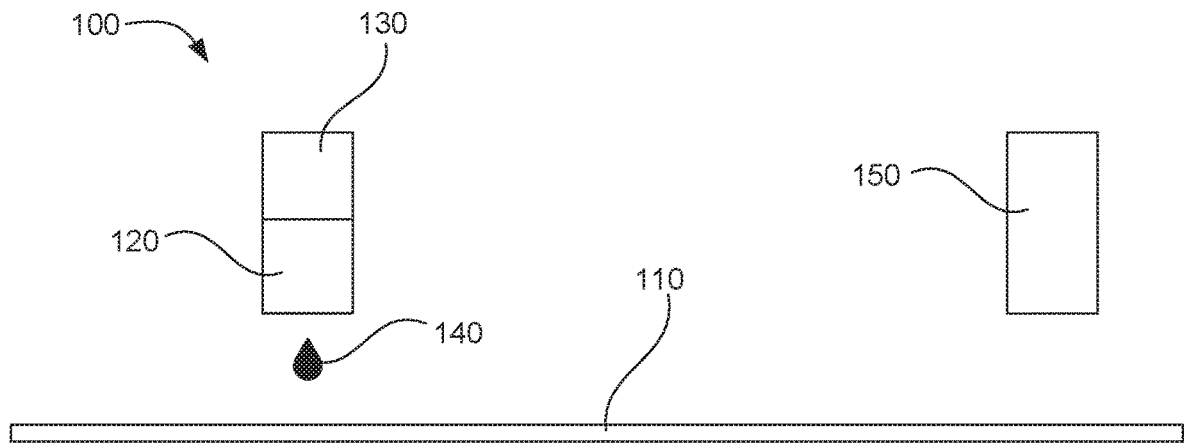
FIG. 1 is a schematic side view of an example printing system in accordance with the present technology.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to UV-curable inkjet inks, fluid sets, and printing systems. In one example, a UV-curable inkjet ink can include: water; a pigment; a photoinitiator; an organic co-solvent; and a polyurethane dispersed in the UV-curable inkjet ink. The organic co-solvent can be present in an amount from 8 wt % to 25 wt % with respect to the total weight of the ink. The polyurethane can be present in an amount from 2 wt % to 20 wt % with respect to the total weight of the ink. The polyurethane can include a polymer strand including a polymer backbone having two ends terminating at a first capping unit and a second capping unit. The polymer backbone can be made up of polymerized monomers, including: a diisocyanate, and a reactive diol selected from an acrylate-containing diol or a methacrylate-containing diol. The first capping unit can include a monoalcohol or a monoamine reacted with an isocyanate group of the diisocyanate. The monoalcohol or monoamine can be selected from an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol. The second capping unit can be 3-(cyclohexylamino)-1-propanesulfonic acid or 2-(cyclohexylamino)ethanesulfonic acid reacted with an isocyanate group of the diisocyanate.

In another example, the polymer backbone can be devoid of ionic stabilizing groups.

In further examples, the UV-curable inkjet ink can include from 0.5 wt % to 1.5 wt % surfactant.

In a certain example, the UV-curable inkjet ink can include a polymeric sensitizer. The polymeric sensitizer can include a functionalized anthrone moiety, a polyether chain, and an amide linkage or an ether linkage attaching one end of the polyether chain to the functionalized anthrone moiety.

In another example, the UV-curable inkjet ink can include from 1 wt % to 2 wt % of a glycol ether penetrant.

In some examples, the reactive diol polymerized in the polymer backbone of the polyurethane can be one of the following reactive diols:

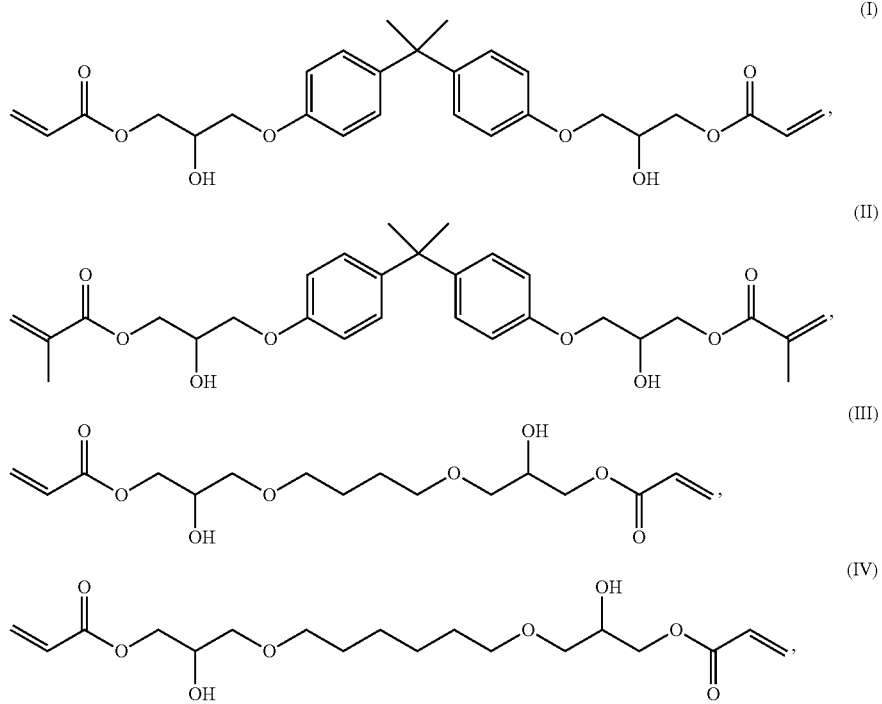

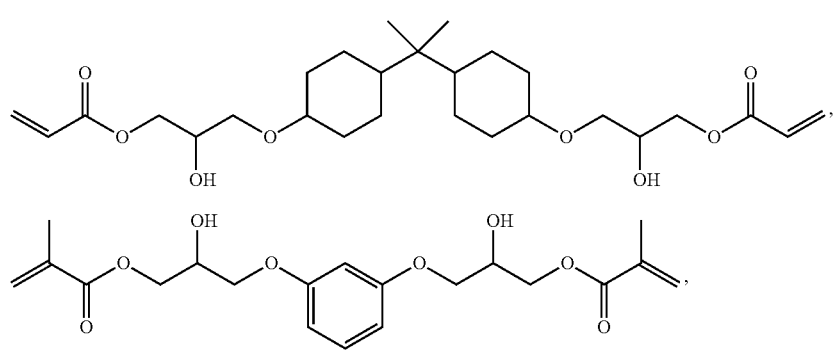
or a combination thereof.
In further examples, the first capping unit can be a monoalcohol or monoamine reacted with the isocyanate group of the diisocyanate. The monoalcohol or monoamine can be selected from:
(VII)
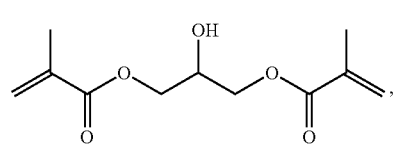
(VIII)
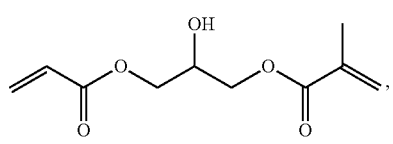
(IX)
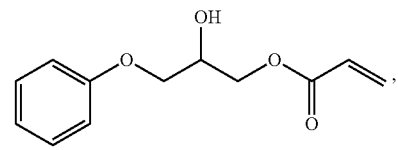
(X)
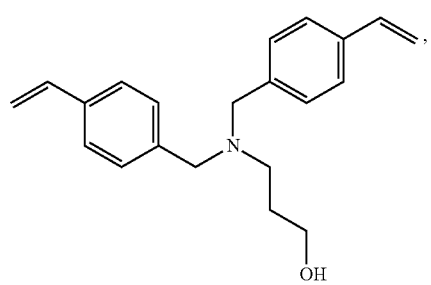
(XI)
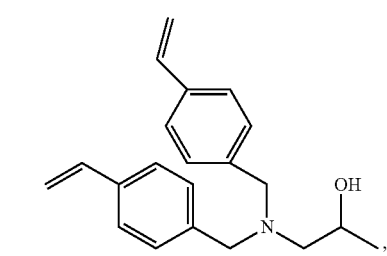
-continued
(XII)
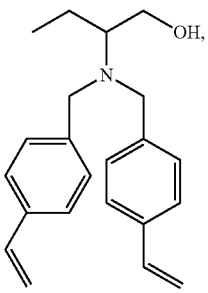
(XIII)
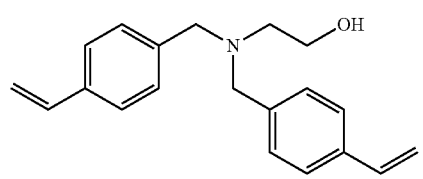
(XIV)
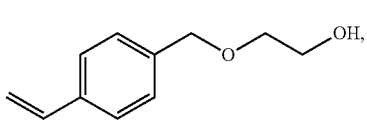
(XV)
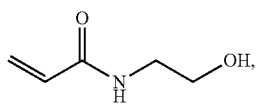
(XVI)
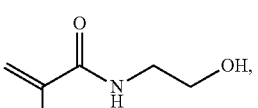
(XVII)
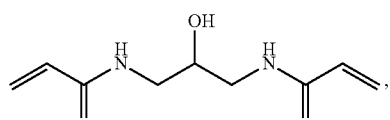
(XVIII)
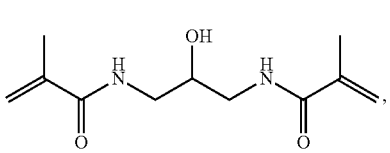

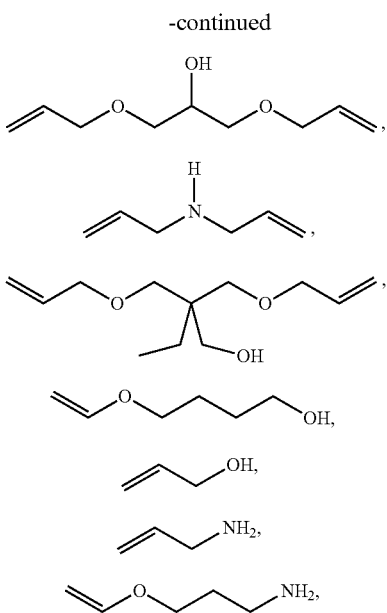

(XIX)
(XX)
(XXI)
(XXII)
(XXIII)
(XXIV)
(XXV)

or a combination thereof.

In another example, a fluid set can include a UV-curable inkjet ink and a UV-curable binder fluid. The UV-curable inkjet ink can include water, a pigment, a photoinitiator, from 8 wt % to 25 wt % organic co-solvent, and from 2 wt % to 20 wt % of a polyurethane dispersed in the ink. The UV-curable binder fluid can be devoid of pigment. The UV-curable binder fluid can include from 8 wt % to 30 wt % of the polyurethane dispersed in the binder fluid. The polyurethane concentration in the binder fluid can be greater than the polyurethane concentration in the ink. The polyurethane can include a polymer strand including a polymer backbone having two ends terminating at a first capping unit and a second capping unit. The polymer backbone can be made up of polymerized monomers including a diisocyanate and a reactive diol. The reactive diol can be selected from an acrylate-containing diol or a methacrylate-containing diol. The first capping unit can include a monoalcohol or monoamine reacted with an isocyanate group of the diisocyanate. The first capping unit can be selected from an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol. The second capping unit can include 3-(cyclohexylamino)-1-propanesulfonic acid or 2-(cyclohexylamino)ethanesulfonic acid reacted with an isocyanate group of the diisocyanate.

In a further example, the binder fluid can also include water, a photo-initiator, and an organic co-solvent. In a particular example, the organic co-solvent can be present in an amount from 8 wt % to 25 wt %.

In another example, the fluid set can include a fixer fluid that includes a cationic polymer.

In yet another example, a printing system can include a vinyl print medium and an inkjet printhead in fluid communication with a reservoir containing a UV-curable inkjet ink and positioned to jet the UV-curable inkjet ink onto the vinyl print medium, and a UV curing lamp positioned to cure the UV-curable inkjet ink on the vinyl print medium. The UV-curable inkjet ink can include: water, a pigment, a photo-initiator, from 8 wt % to 25 wt % organic co-solvent, and from 2 wt % to 10 wt % polyurethane dispersed therein. The polyurethane dispersion can include a polymer strand that includes a polymer backbone having two ends terminating at a first capping unit and a second capping unit. The polymer backbone can be made up of polymerized monomers including a diisocyanate, and a reactive diol selected from an acrylate-containing diol or a methacrylate-containing diol. The first capping unit can include a monoalcohol or a monoamine reacted with an isocyanate group of the diisocyanate. The monoalcohol or monoamine can be selected from an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol. The second capping unit can include 3-(cyclohexylamino)-1-propanesulfonic acid or 2-(cyclohexylamino)ethanesulfonic acid reacted with an isocyanate group of the diisocyanate.

In a further example, the system can also include a UV-curable binder fluid applicator in fluid communication with a reservoir of a UV-curable binder fluid. The UV-curable binder fluid applicator can be positioned to apply the UV-curable binder fluid over the UV-curable inkjet ink once printed on the vinyl print medium. The UV-curable binder fluid can be devoid of pigment and can include from 8 wt % to 30 wt % of the polyurethane dispersed therein. The polyurethane dispersed in the UV-curable binder fluid can be at a greater concentration than the polyurethane dispersed in the UV-curable inkjet ink.

In yet another example, the system can also include a fixer fluid applicator in fluid communication with a reservoir of a fixer fluid and positioned to apply the fixer fluid to the vinyl print medium before the UV-curable inkjet ink is jetted onto the vinyl print medium. The fixer fluid can include a cationic polymer.

In a particular example, the system can be a page-wide high speed inkjet printer adapted to print a page width of 30 cm to 250 cm at a speed from 100 feet per minute to 1,000 feet per minute.

In various examples, the UV-curable inkjet inks described herein can be useful for inkjet printing on vinyl media. Vinyl media is often used for printing flexible articles such as banners, architectural signage, wall and floor graphics, vehicle wraps, and so on. Such applications can benefit from printing methods that provide high image quality, such as good optical density, high gloss, low bleed, and high durability. Inkjet printing can provide these benefits with the added advantages of high print speed, easy content customization, and low cost. However, vinyl print media presents challenges for inkjet printing when compared with other media such as paper. Inkjet ink typically contains a relatively large amount of water along with optional co-solvents that evaporate from the ink after printing. When the ink is printed on a more porous substrate such as paper, the water and co-solvent can be absorbed by the paper quickly, which helps to immobilize the ink. In contrast, vinyl media is typically not designed to accept aqueous inkjet inks. Ink printed onto vinyl media does not penetrate into the media as quickly as with paper media. Additionally, vinyl media is often hydrophobic, causing the aqueous ink to bead on the surface. This can result in lower optical density and poor image quality. Drying the ink printed on the media can also take too much time to allow for high speed printing.

Previous methods used to print on vinyl media have included analog printing methods such as offset printing and flexographic printing. These printing methods can be costly and tedious to set up, often requiring thousands of copies to justify the expense and time required. Digital printing with latex ink has also been used, but often requires multiple pass printing and intense heating to the dry the latex ink.

The UV-curable inkjet inks, fluid sets, and systems described herein can provide comparable optical density, gloss, and durability to commercial offset and flexographic printing on vinyl media. The inks described herein can also be printed using a high speed inkjet printer, which allows for easy content customization. As will be described in more detail below, in some examples the inks can include a UV-curable polyurethane binder that can cross-link when cured under UV-light. In particular, the binder can cross-link when cured by a UV light emitting diode (LED) having a wavelength of about 395 nm. When cured, the binder can form a high molecular weight film with good durability. The binder and ink vehicle can be formulated to allow for good jettability, including good decap performance. The inks can include a co-solvent to promote drying at high speed. In some examples, the inks can be used together with a UV-curable binder fluid and a fixer fluid. The fixer fluid can alcohol or monoamine is selected from an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol. The second capping unit can be formed by reacting 3-(cyclohexylamino)-1-propanesulfonic acid or 2-(cyclohexylamino)ethanesulfonic acid with an isocyanate group at the other end of the polymer backbone.

In some examples, the polymer backbone can be devoid of ionic stabilizing groups such as acid groups. In these examples, the monomers used to form the polymer backbone can be devoid of ionic groups. While the polymer backbone is devoid of ionic stabilizing groups, the capping units can include ionic stabilizing groups to help disperse the polyurethane in the aqueous ink vehicle.

To clarify the structure of polymer strands in the polyurethane dispersion, Formula (I) shows one example of a general chemical structure of a polymer strand in the polyurethane dispersion:

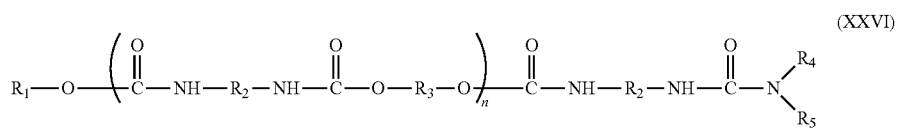

(XXVI)

fix pigments in the ink to prevent bleed and increase image quality. The binder fluid can be applied over the printed ink to provide an additional amount of UV-curable binder to increase the durability of the printed image.

The UV-curable polyurethane binder can be in the form of an aqueous polyurethane dispersion. The dispersion can be added to the ink vehicle such that the polyurethane polymer is dispersed in the ink vehicle. In some examples, the polyurethane can include a polymer strand including a polymer backbone having two ends terminating at a first capping unit and a second capping unit. The polymer backbone can be formed by reacting a diisocyanate with a diol. In this reaction, the hydroxyl groups of the diol react with the isocyanate groups of the diisocyanate to form urethane linkages. In this way, a strand of polymerized diisocyanate and diol monomers can be formed. In some particular examples, the diol used to form the polymer strands described herein can be a reactive diol selected from an acrylate-containing diol or a methacrylate-containing diol. As used herein, "acrylate-containing diol" refers to a chemical compound that has two hydroxyl groups and an acrylate functional group. Similarly, "methacrylate-containing diol" refers to a diol compound that includes a methacrylate functional group. The acrylate or methacrylate groups on the diol segments of the polymer strand can be available for crosslinking during UV-curing.

The capping units can be added at the ends of the polymer backbone. In some examples, the capping units can be formed by reacting a monoalcohol or monoamine with an isocyanate group at the end of a polymer backbone. Because the monoalcohol or monoamine has only one hydroxyl or amino group to react with the isocyanate group, these capping units stop the polymerization of the polymer backbone and terminate the polymer strand. In some examples, the polymer strand can include a first capping unit and a second capping unit. The first capping unit can include a monoalcohol or monoamine reacted with an isocyanate group at the end of a polymer backbone, where the mono- In Formula (I), $R_1$, $R_2$, $R_3$, $R_4$, and $R_5$ can correspond to the following groups: $R_1$ can be an organic group that includes an acrylate, methacrylate, allyl, styrene, acrylamide, or methacrylamide functional group. This can be the first capping unit, which can be formed by reacting a monoalcohol having the formula $R_1$—OH with an isocyanate group at the end of the polymer backbone. In other examples, the first capping units can be formed by reacting a monoamine of the formula $R_1$—$NH_2$ with the isocyanate group, in which case the capping unit would be linked to the polymer backbone through a —NH group instead of an oxygen atom.

$R_2$ can be an organic group that makes up the portion of the diisocyanate between the isocyanate groups. $R_3$ can be an organic group containing an acrylate or methacrylate functional group, which makes up the portion of the reactive diol between the hydroxyl groups. $R_4$ can be an —ethanesulfonic acid group or a—propanesulfonic acid group; and $R_5$ can be a cyclohexyl group. The term "organic group" can generally refer to carbon-containing groups with from 1 to 20 carbon atoms, and can be straight chained, branched, alicyclic, aromatic, etc. Organic groups can be substituted with O, S, P, N, B, etc. The $R_4$ and $R_5$ groups can be attached by reacting 3-(cyclohexylamino)-1-propanesulfonic acid or 2-(cyclohexylamino)ethanesulfonic acid with the isocyanate group at the end of the polymer backbone. Additionally, n can be any integer, for example from 1 to 1,000.

As used herein, "polymerized monomer" is used to describe monomers in their polymerized state, e.g., after the monomers have bonded together to form a polymer chain. The names of monomers in their original state may be used even though it is understood that the monomers change in certain ways during polymerizing. For example, "polymerized diisocyanate and reactive diol" can refer to a polymer chain formed by polymerizing a diisocyanate and a reactive diol, even though the diisocyanate and reactive diol do not actually exist as separate molecules in the polymer. In the case of polymerized diisocyanates and reactive diols, a hydrogen atom of the hydroxyl group of the reactive diol is replaced by a bond between the oxygen atom of the hydroxyl group and the carbon atom of the isocyanate group of the diisocyanate. Thus, the reactive diol is no longer a reactive diol, but has become a portion of a polymer chain. However, "polymerized reactive diol" may still be used to refer to this portion of the polymer chain for the sake of convenience. The portions of the polymer chain formed from diisocyanates or diols can also be referred to as "diisocyanate units" and "diol units" for convenience.

In certain examples, the reactive diol polymerized in the polymer backbone can be selected from the following reactive diols:

or a combination thereof.

The reactive diol can include reactive functional groups that can participate in UV-curing. Acrylate and methacrylate groups can each participate in UV-curing through the double bonds in each of these functional groups. Thus, when the reactive polyurethane dispersion is cured, the double bonds in these groups can link together to form crosslinking between polymer strands.

The diisocyanate polymerized in the polymer backbone is not particularly limited. Generally, the diisocyanate is a molecule having two isocyanate groups that can react with the hydroxyl groups of the reactive diol to form urethane linkages. In some examples, the diisocyanate used in the

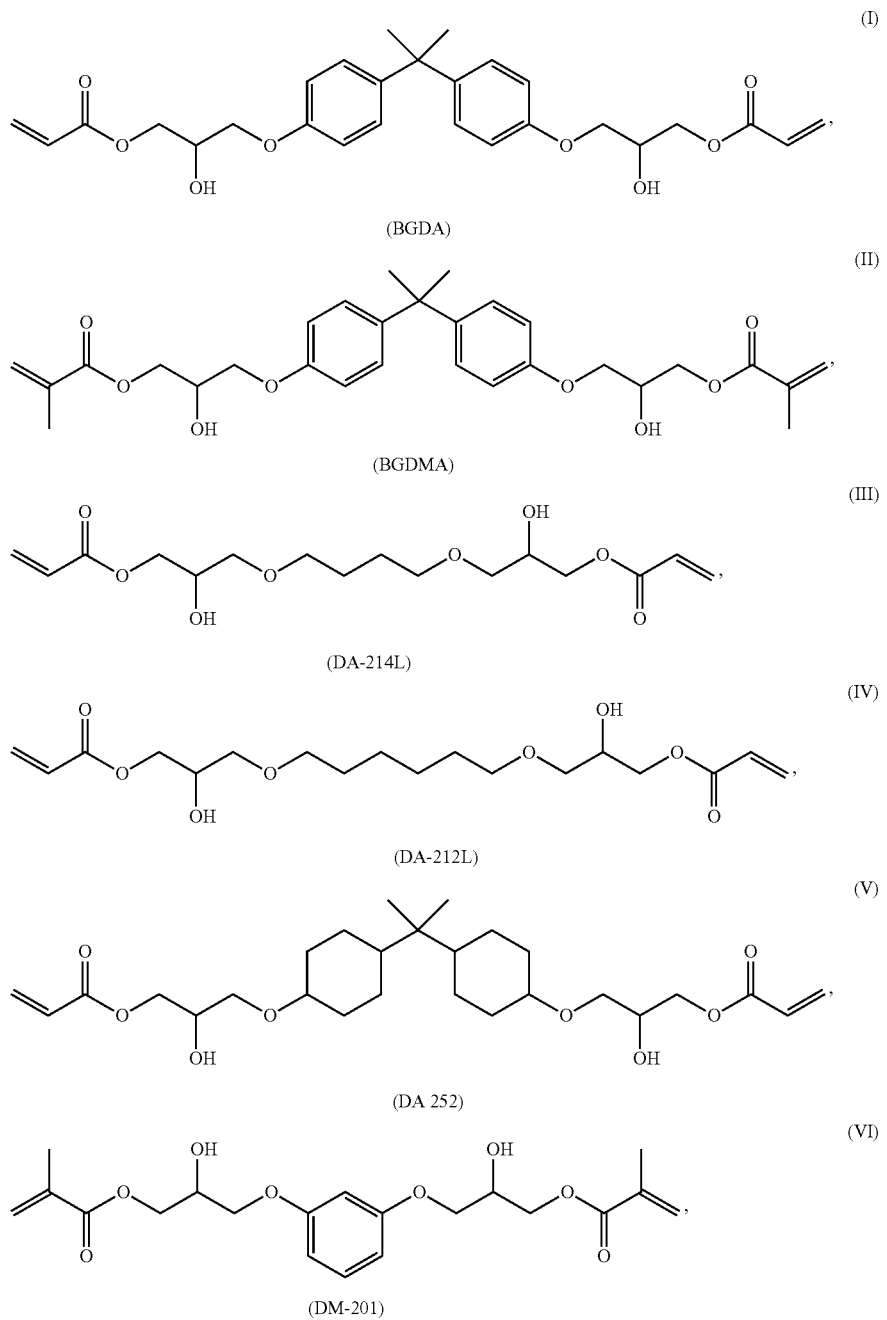

polymer backbone can be non-reactive. That is, the diisocyanate can be devoid of reactive functional groups other than the isocyanate groups. For example, the diisocyanate can be devoid of acrylate, methacrylate, acrylamide, allyl, styrene, and other functional groups that can participate in UV-curing. In alternate examples, the diisocyanate can include such functional groups.

In certain examples, the diisocyanate polymerized in the polymer backbone can be selected from the following diisocyanates:

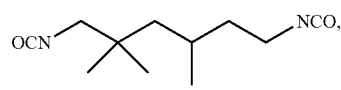
(TMDI)

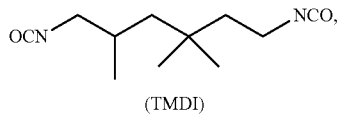
(TMDI)

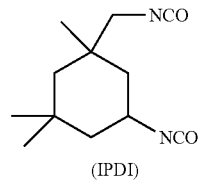
(IPDI)

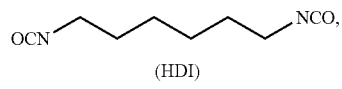
(HDI)

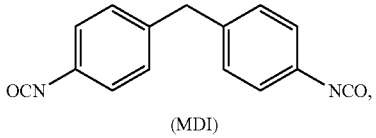
(MDI)

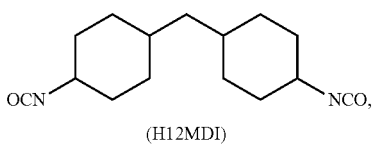
(H12MDI)

or a combination thereof.

Capping units can be added to the polymer backbone by polymerizing a monofunctional monomer with the isocyanate groups at the terminal ends of the polymer backbone. In some examples of the reactive polyurethane dispersion described herein, two distinct capping units can be included in the polymer strands. In certain examples, a polymer strand can have a first capping unit at one end of the polymer backbone, and a second capping unit at the other end of the polymer backbone. The first capping unit can include an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol reacted with an isocyanate group of the diisocyanate of the polymer backbone. The second capping unit can be 3-(cyclohexylamino)-1-propanesulfonic acid or 2-(cyclohexylamino)ethanesulfonic acid reacted with an isocyanate group of the diisocyanate.

In certain examples, the first capping unit can be formed by polymerizing one of the following monoalcohols or monoamines with an isocyanate group of the polymer backbone:

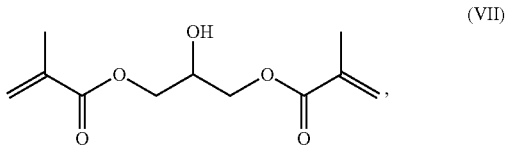
(HPBMA)

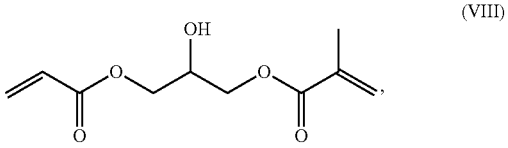
(AHPMA)

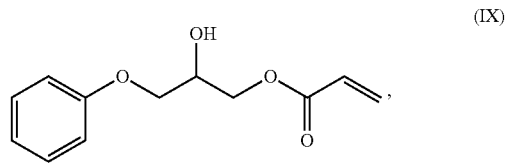
(DA-141)

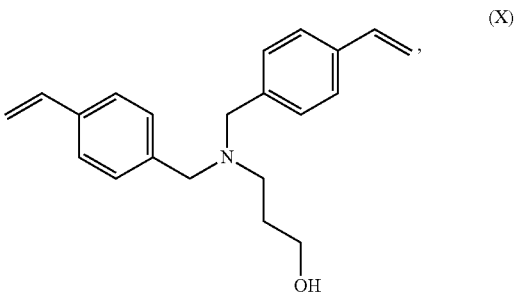

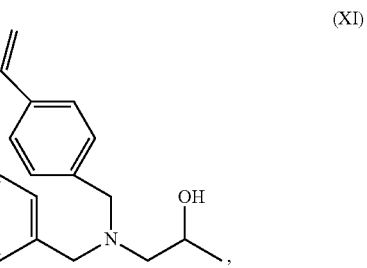

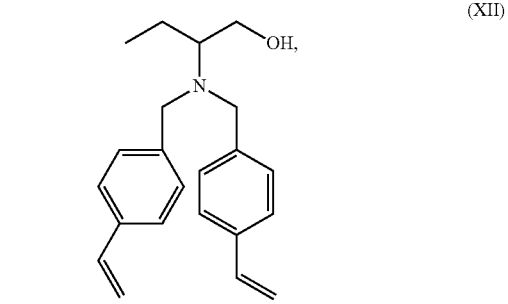

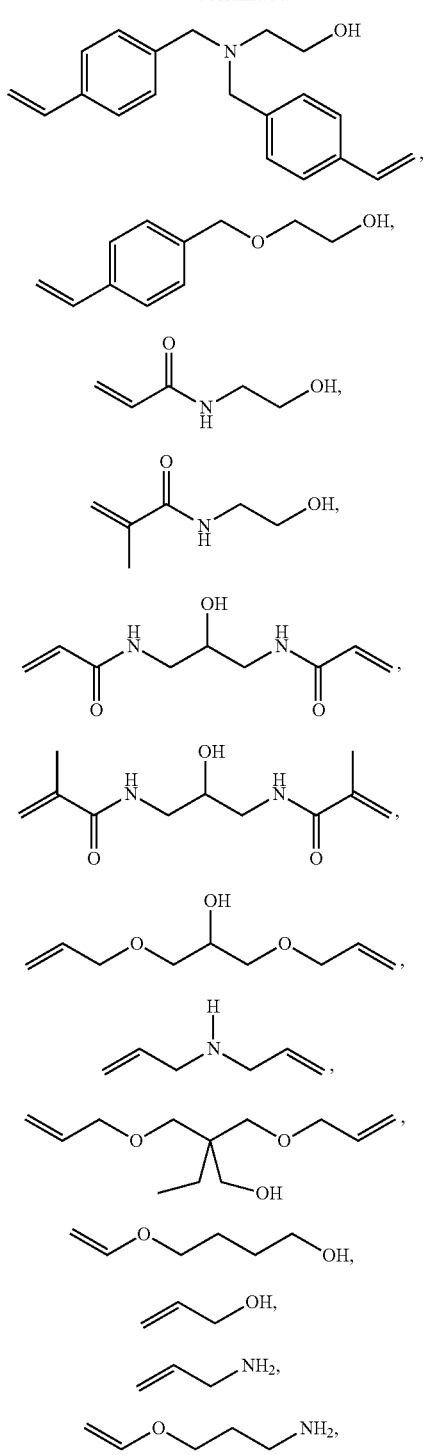

or a combination thereof.

In further examples, the reactive polyurethane dispersion can have a NCO/OH ratio of 1.2 to 10. In another example, the reactive polyurethane dispersion can have a NCO/OH ratio of 2 to 3. As used herein, "NCO/OH ratio" refers to the mole ratio of NCO groups to OH groups in the monomers that react to form the polymer backbone.

In still further examples, the reactive polyurethane dispersion can have a double bond density of 1 to 10. In other examples, the reactive polyurethane dispersion can have a double bond density of 2 to 10, 3 to 10, or 4 to 10. As used herein, "double bond density" refers to the number of millimoles of double bonds in 1 g of the polyurethane polymer by dry weight.

The reactive polyurethane dispersions described herein can have an acid number from 20 to 100. In further examples, the reactive polyurethane dispersion can have an acid number from 25 to 80, from 30 to 60, or from 35 to 50. As used herein, "acid number" refers to the number of milligrams of potassium hydroxide required to neutralize one gram of the polyurethane dispersion, by solid weight.

In various examples, the UV-curable ink can include the reactive polyurethane in an amount from 2 wt % to 20 wt %, based on the dry solids weight of the polyurethane with respect to the total weight of the ink.

In addition to the UV-curable polyurethane, the UV-curable inks described herein can also include an aqueous ink vehicle. In one example, the ink vehicle can include water and an organic co-solvent. In a further example, the organic co-solvent can be present in an amount from 8 wt % to 25 wt % with respect to the total weight of the ink. In a still further example, the organic co-solvent can be present in an amount from 10 wt % to 15 wt %. In a particular example, the organic co-solvent can be 1,2-butanediol. In other examples, the organic co-solvent can include ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol, 2,2-diethyl-1,3-propanediol, glycerin, trimethylolpropane, pentaerythritol, and the like.

The UV-curable ink can also include a surfactant. The surfactant can help the ink wet the vinyl print media. Vinyl print media can have a relatively low surface energy compared to other print media. The UV-curable ink can include a sufficient amount of surfactant to reduce the surface tension of the ink below the surface energy of the vinyl print media. In some cases, the ink can include a sufficient amount of surfactant so that the contact angle between the ink and the vinyl media is 0°. To accomplish this, in certain examples the ink can have a surface tension that is from 3 to 10 dynes below the surface energy of the vinyl media. Vinyl media can vary somewhat in surface energy depending on the composition of the vinyl media, including plasticizers that have been added to the vinyl media. For example, vinyl media can have a surface energy from 28 dynes to 34 dynes. In some examples, the ink can have a surface tension from 18 to 31 and the surface tension of the ink can be from 3 to 10 dynes below the surface energy of the vinyl media. In certain examples, the ink can include a surfactant or a mixture of surfactants in a total amount from 0.5 wt % to 1.5 wt % with respect to the total weight of the ink. Suitable surfactants can include anionic, cationic, amphoteric and nonionic surfactants. Commercially-available surfactants or dispersants include the TAMOL™ series from Dow Chemical Co., nonyl and octyl phenol ethoxylates from Dow Chemical Co. (e.g., TRITON™ X-45, TRITON™ X-100, TRITON™ X-114, TRITON™ X-165, TRITON™ X-305 and TRITON™ X-405) and other suppliers (e.g., the T-DET™ N series from Harcros Chemicals), alkyl phenol ethoxylate (APE) replacements from Dow Chemical Co., Elementis Specialties, and others, various members of the SURFYNOL® series from Air Products and Chemicals, (e.g., SURFYNOL® 104, SURFYNOL® 104A, SURFYNOL® 104BC, SURFYNOL® 104DPM, SURFYNOL® 104E, SURFYNOL® 104H, SURFYNOL® 104PA, SURFYNOL® 104PG50, SURFYNOL® 104S, SURFYNOL® 2502, SURFYNOL® 420, SURFYNOL® 440, SURFYNOL® 465, SURFYNOL® 485. SURFYNOL® 485W, SURFYNOL® 82, SURFYNOL® CT-211, SURFYNOL® CT-221, SURFYNOL® OP-340, SURFYNOL® PSA204, SURFYNOL® PSA216, SURFYNOL® PSA336, SURFYNOL® SE and SURFYNOL® SE-F), Capstone® FS-35 from DuPont, various fluorocarbon surfactants from 3M, E.I. DuPont, and other suppliers, and phosphate esters from Ashland, Rhodia and other suppliers In further examples, the UV-curable inkjet ink can include a penetrant to promote the penetration of the ink into the vinyl media. In some examples, the penetrant can be a glycol ether that has the ability to partially dissolve the vinyl media surface. Non-limiting examples of glycol ether penetrants can include ethylene glycol monomethyl ether, ethylene glycol monoethyl ether, ethylene glycol monopropyl ether, ethylene glycol monoisopropyl ether, ethyl glycol monobutyl ether, ethylene glycol monophenyl ether, diethylene glycol monomethyl ether, diethylene glycol monoethyl ether, diethylene glycol mono-n-butyl ether, tripropylene glycol methyl ether, tripropylene glycol n-butyl ether, dipropylene glycol methyl ether acetate, and other glycol ether solvents. Specific examples of glycol ether penetrants can include glycol ethers from the DOWANOL™ line available from The Dow Chemical Company. In some examples, the glycol ether penetrant can be present in an amount of 1 wt % to 2 wt % with respect to the total weight of the ink.

The UV-curable inkjet ink can also include a photoinitiator. For example, the photoinitiator may be present in the inkjet ink composition in an amount ranging from 0.1 wt % to 10 wt % based on a total wt % of the inkjet ink composition. In other examples, the photoinitiator can be present in an amount from 0.1 wt % to 1 wt %.

In one example, a water soluble photoinitiator can include a trimethylbenzoylphenylphosphinic acid metal salt (i.e., TPA salt) having the following formula:

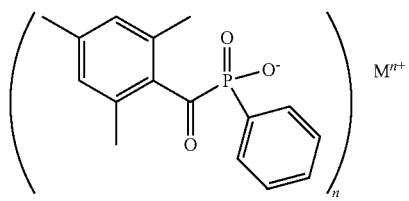

(XXXIII)

where n is any integer from 1 to 5 and M is a metal with a valence from 1 to 5. Examples of suitable metals include Li, Na, K, Cs, Rb, Be, Mg, Ca, Ba, Al, Ge, Sn, Pb, As, and Sb.

In some examples, the water soluble photoinitiator may have a water solubility of at least 0.1 wt % or at least 0.5 wt %. In some instances, the water soluble photoinitiator may have a water solubility up to about 20 wt %.

The water soluble photoinitiator may be used in combination with a sensitizer. When present, the sensitizer may be present in an amount of 0.1 wt % to 10 wt % of the inkjet ink composition. In other examples, the sensitizer can be present in amount of 0.1 wt % to 1 wt %. In some examples, the sensitizer may be a water soluble polymeric sensitizer that includes a functionalized anthrone moiety, a polyether chain, and an amide linkage or an ether linkage attaching one end of the polyether chain to the functionalized anthrone moiety. As used herein, "functionalized anthrone moiety" refers to a moiety having the chemical structure of an anthrone molecule, in which one or more carbon atoms may be optionally substituted with a sulfur atom, an oxygen atom, or a nitrogen atom, and in which one or more hydrogen atoms may be optionally substituted with a functional group. In one example, the anthrone moiety may be a thioxanthrenone moiety. In a further example, the polymeric sensitizer can have the following formula:

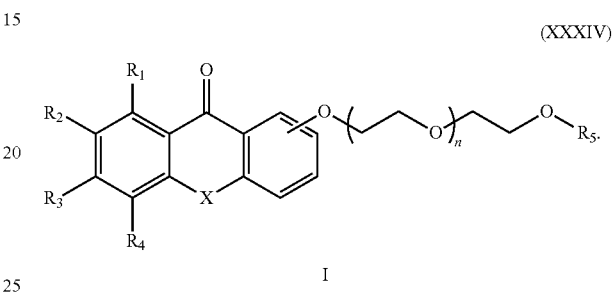

(XXXIV)

I where $R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In the formula above, X can be O, S, or NH and the polyether chain can have n number of repeating monomer units, where n ranges from 1 to 200.

The combination of curable polyurethane, photoinitiator, and sensitizer can allow the present UV-curable inks to be cured using UV-LED light, which has a wavelength of about 395 nm. Accordingly, the UV-curable inks and printing systems described herein provide an alternative to the use of more environmentally hazardous mercury vapor UV lamps.

The colorant in the UV-curable ink can include pigments and optionally dyes. In some examples, the colorant can be present in an amount from 0.5 wt % to 10 wt % in the UV-curable ink. In one example, the colorant can be present in an amount from 1 wt % to 5 wt %.

In some examples, the colorant can include a dye. The dye can be nonionic, cationic, anionic, or a mixture of nonionic, cationic, and/or anionic dyes. Specific examples of dyes that can be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In further examples, the pigment in the UV-curable ink can be self-dispersed with a polymer, oligomer, or small molecule; or can be dispersed with a separate dispersant. Suitable pigments include, but are not limited to, the following pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following black pigments are available from Cabot: Monarch® 1400, Monarch® 1300, Monarch® 1100, Monarch® 1000, Monarch® 900, Monarch® 880, Monarch® 800, and Monarch® 700. The following pigments are available from CIBA: Chromophtal® Yellow 3G, Chromophtal® Yellow GR, Chromophtal® Yellow 8G, Igrazin® Yellow SGT, Igrantee Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure® R-101. The following pigments are available from Heubach: Dalamer® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the UV-curable ink. Additionally, the colorant can include a white pigment such as titanium dioxide, or other inorganic pigments such as zinc oxide and iron oxide.

Various other additives can be employed to optimize the properties of the UV-curable ink. Examples of these additives are those added to inhibit the growth of harmful microorganisms. These additives may be biocides, fungicides, and other microbial agents. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), or a combination thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used if present. Viscosity modifiers and buffers may also be present, as well as other additives to modify properties of the ink as desired. Such additives can be present at from 0.01 wt % to 20 wt % if present.

Anti-kogation agents can also be included in the UV-curable ink. In some examples, anti-kogation agents can be included in an amount of 0.1 wt % to 10 wt % with respect to the total weight of the ink. In other examples, the anti-kogation agents can be included in an amount of 0.1 wt % to 3 wt %. Examples of anti-kogation agent include surfactants of the Crodafos® family available from Croda Inc, such as Crodafos®N3A, Crodafos®N3E, Crodafos®N10A, Crodafos®HCE and Crodafos®SG. Other examples include Arlatone®Map 950 available from Croda Inc; Monofax® 831, Monofax®1214 available from Mona Industries; Monalube® 215 and Atlox®DP13/6 available from Croda Inc; and Liponic® EG-1 (LEG-1) available from Lipo Chemicals.

The UV-curable inkjet inks described above can be used in a fluid set together with a UV-curable binder fluid. For example, an image can be printed using UV-curable ink, and then the UV-curable binder fluid can be applied over the top of the printed ink. The binder fluid can provide additional curable polyurethane binder over the printed image. Together with the curable polyurethane in the ink, the binder fluid can form a durable film when cured with UV light.

In some examples, the binder fluid can include a greater concentration of polyurethane than the UV-curable ink. In one example, the UV-curable ink can include from 2 wt % to 20 wt % polyurethane, while the UV-curable binder fluid includes from 8 wt % to 30 wt % polyurethane. In certain examples, the polyurethane in the UV-curable binder fluid can be the same polyurethane that is included in the UV-curable ink. Using a separate binder fluid with a greater concentration of polyurethane together with the ink can provide increased durability of the printed image while avoiding potential jettability issues caused by having a high concentration of polyurethane together with the pigment in the ink.

In some examples, the binder fluid can include a photoinitiator, a sensitizer, a co-solvent, a penetrant, a surfactant, water, or combinations thereof. In certain examples, the binder fluid can include the same ingredients present in the UV-curable ink, except that the binder fluid does not include a colorant. In further examples, the binder fluid can include the same ingredients present in the UV-curable ink, except that the binder fluid does not include an anti-kogation agent or a colorant. In one example, the amounts of co-solvent, penetrant, photoinitiator, sensitizer, and surfactant can be the same as the amounts of these ingredients in the UV-curable ink, while the amount of polyurethane in the binder fluid can be greater than the amount in the UV-curable ink. In a particular example, the binder fluid can include a co-solvent such as 1,2-butanediol in an amount from 8 wt % to 25 wt % with respect to the total weight of the binder fluid.

The UV-curable ink and UV-curable binder fluid can also be used together with a fixer fluid. The fixer fluid can be applied to the vinyl media before the UV-curable ink is printed onto the media. The fixer fluid can include a cationic polymer that is capable of immobilizing pigment particles in the UV-curable ink printed over the fixer fluid.

FIG. 1 shows an example printing system 100 for printing in accordance with the present disclosure. The system includes a vinyl print medium 110 and an inkjet printhead 120. The inkjet printhead is in fluid communication with a reservoir 130 containing a UV-curable inkjet ink 140. The UV-curable inkjet ink can include the ingredients described above. The system further includes a UV curing lamp 150 positioned to cure the UV-curable inkjet ink on the vinyl print medium.

Figure 2:
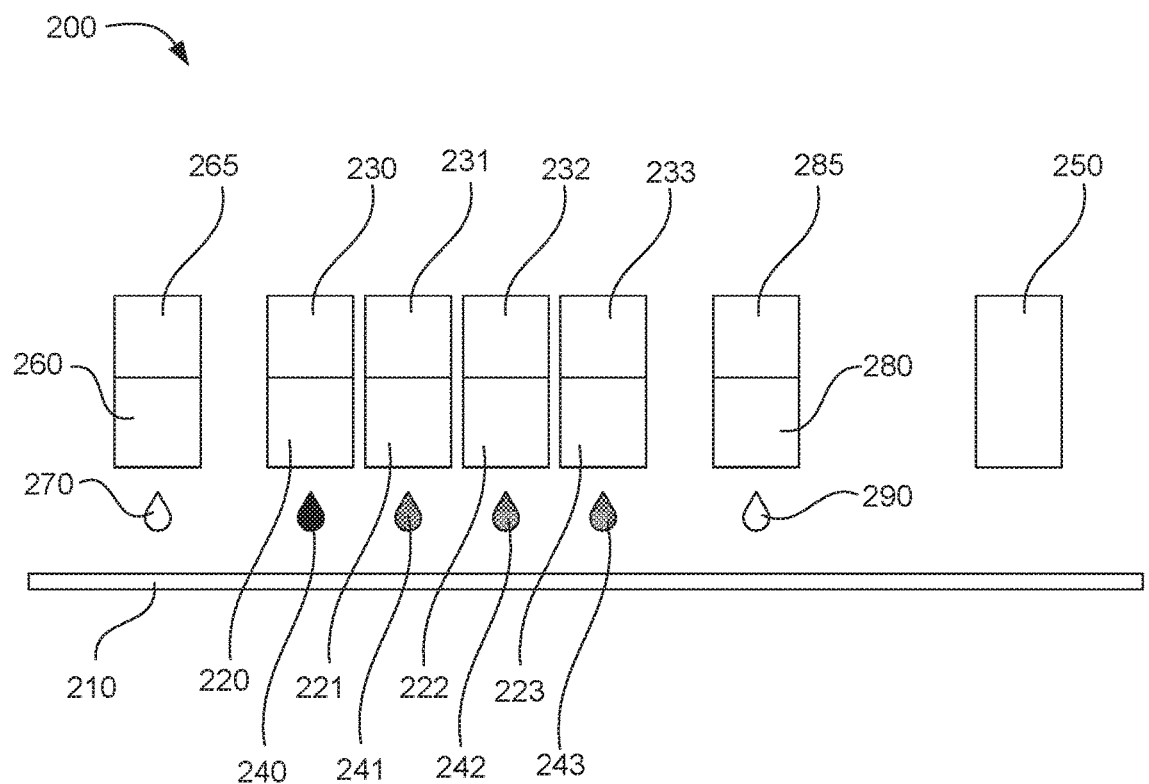
FIG. 2 is a schematic side view of another example printing system in accordance with the present technology.

FIG. 2 shows a more specific example printing system 200. This system includes a vinyl print medium 210 and four inkjet printheads 220, 221, 222, 223. The inkjet printheads are in fluid communication with reservoirs 230, 231, 232, 233 that contain UV-curable inkjet inks 240, 241, 242, 243. The four inks can be in different colors, such as cyan, magenta, yellow, and black. The system also includes a fixer fluid applicator 260 in fluid communication with a reservoir 265 containing a fixer fluid 270. The fixer fluid applicator is positioned to apply the fixer fluid to the vinyl print medium before the UV-curable inkjet ink is jetted onto the vinyl print medium. The fixer fluid can include a cationic polymer as described above. The system also includes a UV-curable binder fluid applicator 280 in fluid communication with a reservoir 285 containing a UV-curable binder fluid 290. The UV-curable binder fluid applicator is positioned to apply the UV-curable binder fluid over the UV-curable inkjet ink once printed on the vinyl print medium and before the UV curing lamp 250 cures the ink and binder fluid. The UV-curable binder fluid can include the ingredients described above.

The fixer fluid and UV-curable binder fluid applicators can be digital or analog applicators. In some examples, one or both of these applicators can be a digital applicator such as an inkjet printhead. The applicators can optionally be used to apply fixer fluid and/or binder fluid in only the locations where UV-curable inkjet ink is printed. In other examples, one or both can be an analog applicator such as a sprayer. In these examples, the applicators can coat the entire surface of the vinyl print medium with fixer fluid and/or binder fluid.

In some examples, the UV curing lamp can include UV-LEDs that emit a wavelength of about 395 nm. In other examples, the UV curing lamp can be a lamp that emits a wavelength in the range of about 240 nm to 400 nm.

In further examples, the printing system can be a page-wide high speed inkjet printer. In page-wide printers, each of the inkjet printheads can have a width sufficient to print ink across the entire width of the medium without requiring the printhead to move across the width of the medium. In other words, the printhead can include nozzles in a sufficient number and positioned across the width of the printhead so that ink can be printed to any location across the width of the medium. In some cases, the printheads can have all the nozzles in a single row, while in other cases the printheads can include multiple groupings of nozzles in staggered locations. However, the nozzles can be arranged in such a way that ink can be applied to any location across the width of the medium. In various examples, the medium can be in the form of sheets or a roll-fed web that is travelling past the printheads. The fixer fluid applicator and UV-curable binder fluid applicator can also be wide enough to apply fluid to the entire width of the medium. In such systems, the vinyl print medium can be fed past the fixer fluid applicator, inkjet printheads for printing several different colors of ink, and binding fluid applicator, and the UV curing lamp. In some examples, "high speed" can mean that the medium can be printed at a speed from 100 feet per minute to 1,000 feet per minute. Additionally, the pagewide printer can be capable of printing a page width of 30 cm to 250 cm.

In further examples, a method of printing can include jetting a UV-curable inkjet ink onto a vinyl print medium, where the UV-curable inkjet ink can include any of the ingredients described above. The method can further include curing the UV-curable inkjet ink with UV light to form a durable printed image. In certain examples, the method can include applying a fixer fluid to the vinyl print medium before jetting the ink onto the medium. The fixer fluid can include a cationic polymer as described above. In other examples, the method can include applying a UV-curable binder fluid over the printed ink after the ink has been jetted onto the vinyl print medium. The UV-curable binder fluid can include the same polyurethane as in the ink, but in a concentration greater than in the ink. The UV-curable binder fluid can also be devoid of pigment.

In various examples, the UV-curable inkjet inks can be used together with UV-curable binder fluid and fixer fluid to provide printed images with increased durability, gloss, and optical density. The UV-curable inkjet inks can also be printed from thermal inkjet architecture with good decap performance.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "UV-curable" refers to compositions that can be cured by exposure to ultraviolet light from any UV source such as a mercury vapor lamp, UV LED source, or the like. Mercury vapor lamps emit high intensity light at wavelengths from 240 nm to 270 nm and 350 nm to 380 nm. "LED curable" refers to compositions that can be cured either by ultraviolet light from an ultraviolet LED. Ultraviolet LEDs emit light at specific wavelengths. For example, ultraviolet LEDs are available at 365 nm and 395 nm wavelengths, among others.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily describes the use of pigment colorants, the term "pigment" can be used more generally to describe not only pigment colorants, but other pigments such as organometallics, ferrites, ceramics, etc. In one specific example, however, the pigment is a pigment colorant.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Synthesis of PUD 1

22.506 g of g of BGDA, 0.225 g of MEHQ, 36.553 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 26.500 g of HPBMA, 0.265 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 14.441 g of 2-(cyclohexylamino)ethansesulfonic acid (CHES), 5.852 g of 50% NaOH, and 38.102 g of deionized water are mixed in a beaker until CHES is completely dissolved. The CHES solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 187.6144 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 21.93 nm. Its pH was 7.0. Solid content was 27.22%.

Example 2—Synthesis of PUD 2

29.247 g of g of BGDA, 0.292 g of MEHQ, 38.002 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 19.285 g of HPBMA, 2.770 g of HEAA, 0.221 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 1.511 g of taurine, 10.686 g of 3-(cyclohexylamino)-1-propanesulfonic acid (CAPS), 7.902 g of 45% KOH, and 53.431 g of deionized water are mixed in a beaker until both taurine and CAPS are completely dissolved. The taurine and CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 169.242 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 21.93 nm. Its pH was 7.5. Solid content was 30.83%.

Example 3—Synthesis of PUD 3

27.898 g of g of BGDA, 0.279 g of MEHQ, 33.228 g of H12MDI, 2.559 g of IPDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 21.024 g of HPBMA, 0.210 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 15.290 g of 3-(cyclohexylamino)-1-propanesulfonic acid (CAPS), 5.803 g of 50% NaOH, and 38.225 g of deionized water are mixed in a beaker until CAPS is completely dissolved. The CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 186.286 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 20.04 nm. Its pH was 6.0. Solid content was 30.06%.

Example 4—Synthesis of PUD 4

31.807 g of g of BGDA, 0.318 g of MEHQ, 41.327 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 13.602 g of HEAA, 0.136 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 1.643 g of taurine, 11.621 g of 3-(cyclohexylamino)-1-propanesulfonic acid (CAPS), 8.593 g of 45% KOH, and 58.106 g of deionized water are mixed in a beaker until both taurine and CAPS are completely dissolved. The taurine and CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 177.942 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 24.72 nm. Its pH was 7.0. Solid content was 30.69%.

Example 5—Synthesis of PUD 5

32.213 g of g of BGDA, 0.322 g of MEHQ, 42.189 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 13.776 g of HEAA, 0.138 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 3.328 g of taurine, 8.827 g of 3-(cyclohexylamino)-1-propanesulfonic acid (CAPS), 8.703 g of 45% KOH, and 44.137 g of deionized water are mixed in a beaker until both taurine and CAPS are completely dissolved. The taurine and CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 190.972 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 22.48 nm. Its pH was 7.0. Solid content was 30.69%.

Example 6—Synthesis of Comparative PUD 6

33.732 g of g of BGDA, 0.337 g of MEHQ, 40.176 g of H12MDI, 3.095 g of isophorone diisocyanate (IPDI) and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. The measured NCO value was 10.32%. Theoretical % NCO was 10.63%. 16.028 g of HEAA (N-hydroxylethyl acrylamide, CAS #7646-67-5, purchased from Sigma Aldrich), 0.160 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50°

C. 0.5 g of pre-polymer was withdrawn for final % NCO titration. The measured NCO value was 2.49%. The theoretical % NCO was 2.51%. The polymerization temperature was reduced to 40° C. 6.969 g of taurine, 4.678 g of 50% NaOH, and 34.846 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 197.314 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent if there are a lot of foaming). The final PUD dispersion was filtered through fiber glass filter paper. Particle size measured by Malvern Zetasizer is 25.5 nm. Its pH was 7.4. Solid content was 30.0%. This PUD shows a 0.19 unit pH drop after 1 week ASL.

Example 7—Synthesis of Comparative PUD 7

38.884 g of g of BGDA, 0.389 g of MEHQ, 42.103 g of H12MDI, and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. The measured NCO value was 7.6%. Theoretical % NCO was 8.32%. 12.318 g of HEAA (N-hydroxylethyl acrylamide, CAS #7646-67-5, purchased from Sigma Aldrich), 0.159 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50° C. 0.5 g of pre-polymer was withdrawn for final % NCO titration. The measured NCO value was 2.41%. The theoretical % NCO was 2.41%. The polymerization temperature was reduced to 40° C. 6.695 g of taurine, 4.494 g of 50% NaOH, and 33.474 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 194.649 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 26.8 nm. Its pH was 6.0. Solid content was 30.04%. This PUD shows a 0.13 unit pH drop after 1 week ASL.

Example 8—Synthesis of PUD 8

31.410 g of g of BGDA, 0.314 g of MEHQ, 40.812 g of H12MDI, and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 13.432 g of HEAA, 0.134 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 13.435 g of 3-(cyclohexylamino)-1-propanesulfonic acid (CAPS), 8.486 g of 45% KOH, and 71.727 g of deionized water are mixed in a beaker until CAPS is completely dissolved. The CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 165.236 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 16.08 nm. Its pH was 7.3. Solid content was 29.58%.

Example 9—Synthesis of PUD 9

24.673 g of g of BGDA, 0.247 g of MEHQ, 40.073 g of H12MDI, and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 21.024 g of HPBMA, 0.184 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 16.903 g of 3-(cyclohexylamino)-1-propanesulfonic acid (CAPS), 9.999 g of 45% KOH, and 42.257 g of deionized water are mixed in a beaker until CAPS is completely dissolved. The CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 183.899 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 156.42 nm. Its pH was 7.5. Solid content was 28.92%.

Example 10—Synthesis of Comparative PUD 10

33.545 g of g of BGDA (see compound XVII above), 0.335 g of 4-methoxyphenol (MEHQ), 43.585 g of 4,4'-

Methylene dicyclohexyl diisocyanate (H12MDI), and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. The measured NCO value was 10.35%. Theoretical % NCO was 10.55%. 15.939 g of HEAA (N-hydroxylethyl acrylamide, CAS #7646-67-5, purchased from Sigma Aldrich), 0.159 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50° C. 0.5 g of pre-polymer was withdrawn for final % NCO titration. The measured NCO value was 2.45%. The theoretical % NCO was 2.50%. The polymerization temperature was reduced to 40° C. 6.931 g of taurine, 4.652 g of 50% NaOH, and 34.653 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 197.381 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent). The final PUD dispersion was filtered through fiber glass filter paper. Particle size measured by Malvern Zetasizer is 32.6 nm. Its pH was 7.5. Solid content was 29.08%. This PUD shows a 0.47 unit pH drop after 1 week ASL.

Example 11—Synthesis of PUD 11

22.288 g of g of BGDA, 0.223 g of MEHQ, 36.199 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples were withdrawn for % NCO titration to confirm the reaction. 26.244 g of a compound of the formula (XIV') above (HPBMA), 0.262 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 15.269 g of 3-(cyclohexylamino)-1-propanesulfonic acid (CAPS), 5.795 g of 50% NaOH, and 38.172 g of deionized water are mixed in a beaker until CAPS is completely dissolved. The CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 186.374 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 18.98 nm. Its pH was 7.5. Solid content was 28.21%.

Example 12—UV-Curable Ink Compositions

UV-curable ink compositions and a UV-curable binder fluid were formed using several of the polyurethane dispersions described above. The inks and binder fluid had the compositions shown in Table 1:

TABLE 1

| Ingredients | Black Ink | Cyan Ink | Magenta Ink | Binder Fluid |
| --- | --- | --- | --- | --- |
| Pigment | 2.5 wt % (black) | 2.0 wt % (cyan) | 4.0 wt % (magenta) | None |
| PUD 1 | 5 wt % | 5 wt % | 5 wt % | 8 wt % |
| 1,2-butanediol | 12 wt % | 12 wt % | 12 wt % | 12 wt % |
| Dowanol™ TPM | 1.5 wt % | 1.5 wt % | 1.5 wt % | 1.5 wt % |
| TXPEG550 | 0.85 wt % | 1.5 wt % | 1.5 wt % | 1.5 wt % |
| TPA Na | 0.5 wt % | 0.5 wt % | 0.5 wt % | 0.5 wt % |
| Surfynol® CT-211 | 0.7 wt % | 0.7 wt % | 0.7 wt % | 0.7 wt % |
| Capstone® FS-35 | 0.3 wt % | 0.3 wt % | 0.3 wt % | 0.3 wt % |
| LEG-1 | 1 wt % | 1 wt % | 1 wt % | None |
| Crodafos | 1 wt % | 1 wt % | 1 wt % | None |
| Water | Balance | Balance | Balance | Balance |

In the compositions shown in Table 1, 1,2-butanediol acts as a co-solvent to increase decap performance of the inks; Dowanol™ TPM (available from The Dow Chemical Company) is a glycol ether penetrant; TX-PEG-550 is a mono-(2-oxythioxanthone) derivative of PEG 550; TPA Na is sodium phenyl-(2,4,6-trimethylbenzoyl)phosphinate; Surfynol® CT-211 is a surfactant (available from Air Products); Capstone® FS-35 is a surfactant (available from DuPont); LEG-1 is Liponic® EG-1 (available from Lipo Chemicals) which acts as an anti-kogation agent together with Crodafos; and Crodafos is an anti-kogation agent (available from Croda, Inc.).

Example 13—Durability

Black inks were prepared with the same formula as in Table 1 but with various different polyurethane dispersions included in each ink. Each ink was printed using an inkjet printer at a rate of 25 feet per minute; the binder fluid was applied over the inks, and cured under UV LED light at a rate of 25 feet per minute. The ink films were subjected to the following tests: a) optical density was measured using an X-Rite Spectrophotometer directly on the white, non-porous vinyl media; b) gloss was measured at a 75° angle with the X-Rite Spectrophotometer; c) Windex Rub: rub with Crockmeter Test Cloth and Windex® cleaning solution 5 times with 250 g of weight applied; d) 70 vol % IPA Rub: rub with Crockmeter Test Cloth and 70 vol % isopropyl alcohol with 250 g of weight applied; e) Tape Adhesion: apply Scotch® tape and then remove; f) Wet Rub: rub once with Crockmeter Test Cloth and water with no applied weight; g) Sutherland® 100 Rub Test: On a Sutherland® Rub Tester, heat to 350° F., rub 100 times with 4 psi at speed 2; h) Sutherland® 200 Rub Test: On a Sutherland® Rub Tester, heat to 350° F., rub 200 times with 4 psi at speed 2. All of the rub tests except for Sutherland® Rub Test are scored from 0.0 to 5.0 with 0.0 being the best score and 5.0 being the worst score. The Sutherland® Rub Test is scored from 1.0 to 5.0 with 5.0 being the best score and 1.0 being the worst score.

Table 2 shows the results of these tests on the black inks:

TABLE 2

| Black Ink | PUD | OD | Gloss | Windex | 70% IPA | Tape | Wet Rub | Sutherland 100 | Sutherland 200 |
|---|---|---|---|---|---|---|---|---|---|
| A | 1 | 1.78 | 74.6 | 0.5 | 1.5 | 0.0 | 0.0 | 5.0 | 5.0 |
| B | 2 | 1.68 | 67.0 | 1.0 | 1.5 | 0.0 | 3.5 | 3.0 | 1.0 |
| C | 3 | 1.75 | 70.3 | 0.5 | 1.5 | 0.0 | 2.0 | 4.0 | 3.0 |
| D | 4 | 1.63 | 70.7 | 2.0 | 2.0 | 5.0 | 4.5 | 2.0 | 1.0 |
| E | 5 | 1.64 | 75.0 | 2.0 | 2.0 | 5.0 | 4.5 | 2.0 | 1.0 |
| F | 6 | 1.72 | 74.9 | 2.5 | 2.0 | 5.0 | 4.5 | 4.0 | 3.0 |
| G | 7 | 1.73 | 76.0 | 0.5 | 2.0 | 5.0 | 3.5 | 2.0 | 1.0 |
| H | 8 | 1.63 | 73.1 | 1.0 | 3.0 | 5.0 | 4.0 | 2.0 | 1.0 |
| I | 9 | 1.55 | 65.3 | 0.5 | 3.0 | 0.0 | 4.5 | 3.0 | 1.0 |

Example 14—Bleed

The black ink and the cyan ink having the formulas shown in Table 1 were printed wet-on-wet in touching regions on the media. The color regions were evaluated visually for feathering of the colors. The inks showed no feathering.

Example 15—Decap

The black inks of Table 2 were jetted from two inkjet pens using the following test procedure. All nozzles were fired ten times to print ten adjacent lines. This process was then repeated several times with various time delays between firing, including 0.3 second, 1 second, 3 second, 6 second, and 10 second delays. Optimal decap performance is shown by printing a whole first line after a 3 second delay, i.e., all nozzles fire after a 3 second delay. The test is scored as follows: T5 has a whole first line printed after a 3 second delay; T4 has a partial first line but a whole second line, i.e., the nozzles recover on the second line; T3 requires several lines, such as 4-5 lines, to recover; T2 requires more than 5 lines to recover; T1 requires more than 10 lines to recover; Fail means no recovery. Table 3 shows the decap test results:

TABLE 3

| Black Ink | PUD | Decap score (pen 1) | Decap score (pen 2) |
|---|---|---|---|
| A | 1 | T4 | T4 |
| B | 2 | T4 | T4 |
| C | 3 | T4 | T4 |
| D | 4 | T3 | T3 |
| E | 5 | T3 | T3 |
| F | 6 | T2 | T2 |
| G | 7 | T2 | T2 |
| H | 8 | T2 | T2 |
| I | 9 | Fail | Fail |

Example 16—SPAR Test

To test the print nozzles for buildup that may cause misdirection of ink droplets, the SPAR test was performed. In this test, the cyan ink as shown in Table 1 was printed from 10,000 nozzles with a frequency of 6 kHz continuously for 4 hours without wiping or cleaning the nozzles. Digital camera equipment was used to detect misdirected ink droplets printed on the media. The test is passed when less than 2% of the nozzles (200 nozzles) are misdirected after 1 hour of firing. The maximum number of misdirected nozzles per hour during the test was about 150.

What is claimed is:

1. A UV-curable inkjet ink, comprising:
   water;
   a pigment;
   a photo-initiator;
   from 8 wt % to 25 wt % organic co-solvent; and
   from 2 wt % to 20 wt % of a polyurethane dispersed in the UV-curable inkjet ink, wherein the polyurethane comprises a polymer strand including a polymer backbone having two ends terminating at a first capping unit and a second capping unit, wherein the polymer backbone comprises polymerized monomers, including:
   a diisocyanate, and
   a reactive diol selected from:

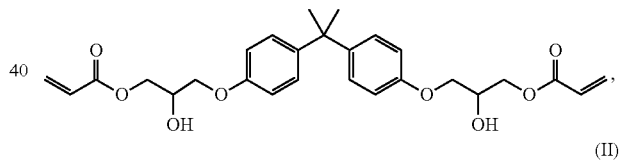

(I)

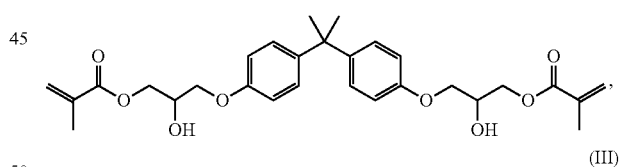

(II)

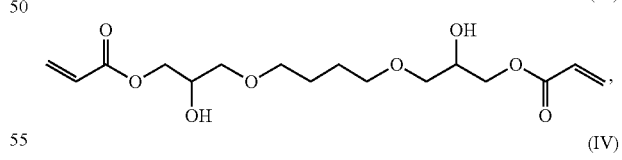

(III)

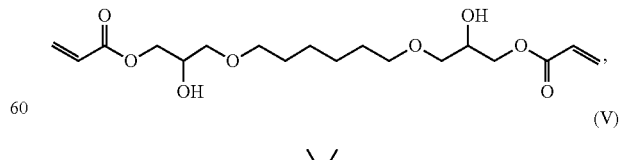

(IV)

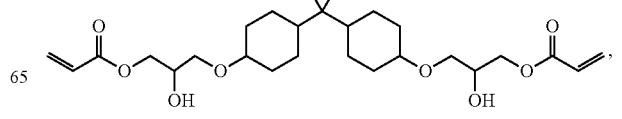

(V)

-continued

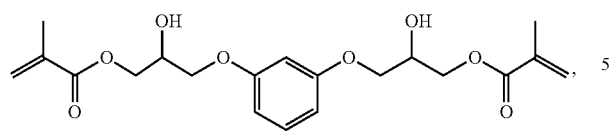

or a combination thereof,
wherein the first capping unit comprises a monoalcohol or a monoamine reacted with an isocyanate group of the diisocyanate, and which is selected from an acrylate-containing monoalcohol, a methacrylate-containing monoalcohol, an ally-containing monoalcohol, an allyl-containing monoamine, a styrene-containing monoalcohol, an acrylamide-containing monoalcohol, or a methacrylamide-containing monoalcohol; and
wherein the second capping unit comprises 3-(cyclohexylamino)-1-propanesulfonic acid or 2-(cyclohexylamino)ethanesulfonic acid reacted with an isocyanate group of the diisocyanate.

2. The UV-curable inkjet ink of claim 1, wherein the polymer backbone is devoid of ionic stabilizing groups.

3. The UV-curable inkjet ink of claim 1, further comprising from 0.5 wt % to 1.5 wt % surfactant.

4. The UV-curable inkjet ink of claim 1, further comprising a polymeric sensitizer including a functionalized anthrone moiety, a polyether chain, and an amide linkage or an ether linkage attaching one end of the polyether chain to the functionalized anthrone moiety.

5. The UV-curable inkjet ink of claim 1, further comprising from 1 wt % to 2 wt % of a glycol ether penetrant.

6. The UV-curable inkjet ink of claim 1, wherein the first capping unit is a monoalcohol or monoamine reacted with the isocyanate group of the diisocyanate, and selected from:

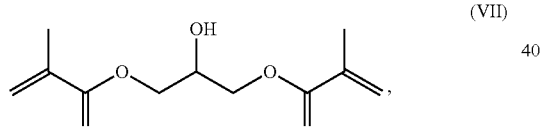
(VII)

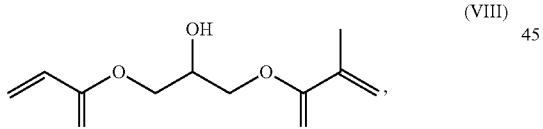
(VIII)

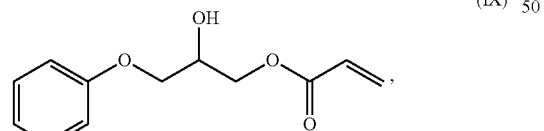
(IX)

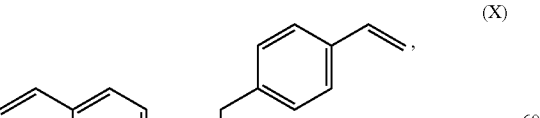
(X)

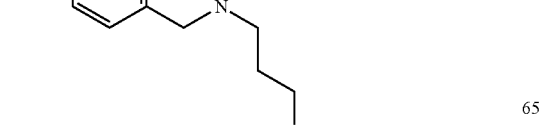

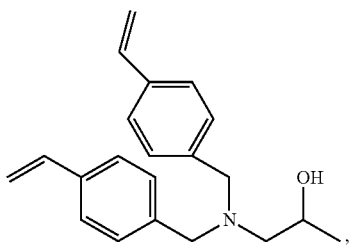
(XI)

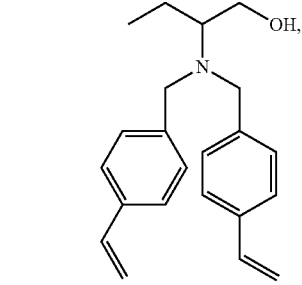
(XII)

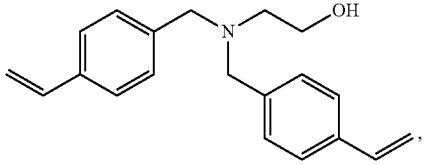
(XIII)

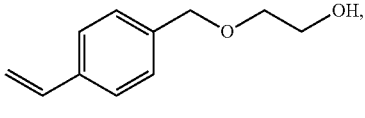
(XIV)

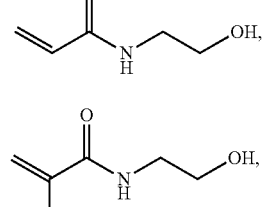
(XV)

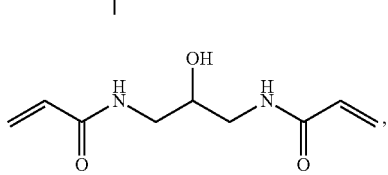
(XVI)

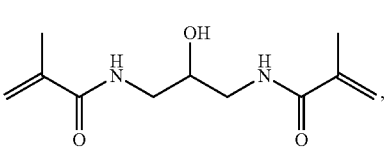
(XVII)

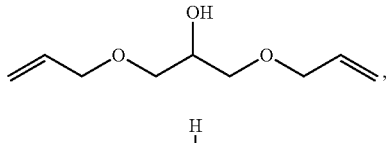
(XVIII)

(XIX)

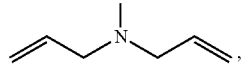
(XX)

-continued

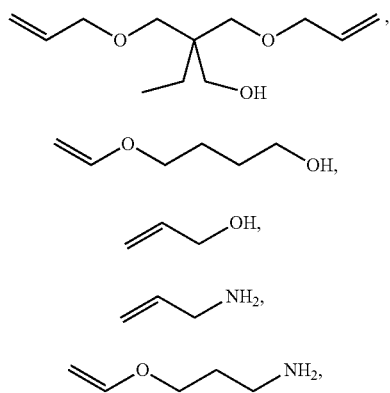

or a combination thereof.

7. A fluid set, comprising:
a UV-curable inkjet ink, comprising:
   water,
   a pigment,
   a photo-initiator,
   from 8 wt % to 25 wt % organic co-solvent, and
   from 2 wt % to 20 wt % polyurethane dispersed therein; and
a UV-curable binder fluid that is devoid of pigment and includes from 8 wt % to 30 wt % of the polyurethane dispersed therein, wherein the polyurethane dispersed in the UV-curable binder fluid is at a greater concentration than the polyurethane dispersed in the UV-curable inkjet ink,
wherein the polyurethane comprises a polymer strand comprising a polymer backbone having two ends terminating at a first capping unit and a second capping unit, wherein the polymer backbone comprises polymerized monomers including:
   a diisocyanate, and
   a reactive diol selected from:

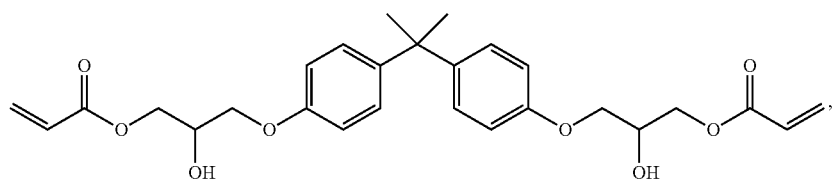

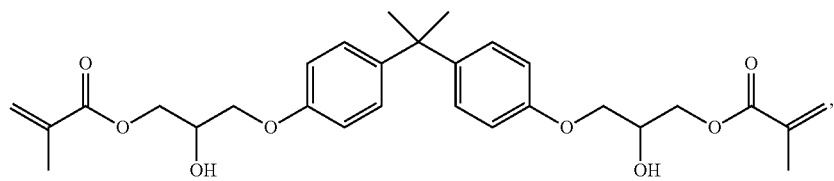

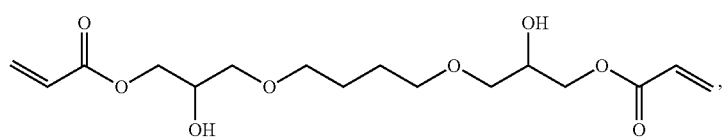

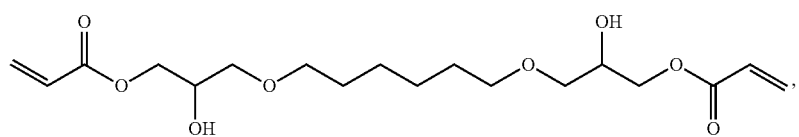

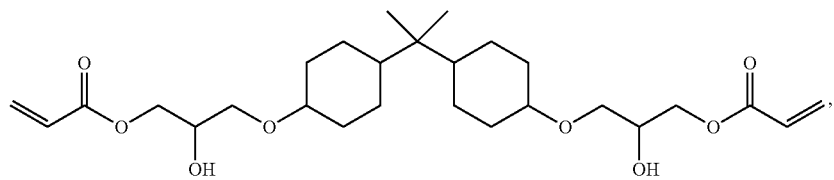

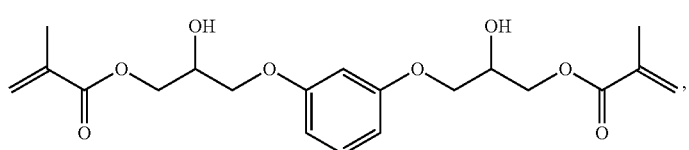

or a combination thereof;

wherein the first capping unit comprises a monoalcohol or a monoamine reacted with an isocyanate group of the diisocyanate, and which is selected from an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol; and wherein the second capping unit comprises 3-(cyclohexylamino)-1-propanesulfonic acid or 2-(cyclohexylamino)ethanesulfonic acid reacted with an isocyanate group of the diisocyanate.

8. The fluid set of claim 7, wherein the binder fluid further comprises water, a photo-initiator, and an organic co-solvent.

9. The fluid set of claim 8, wherein the organic co-solvent is present in an amount from 8 wt % to 25 wt %.

10. The fluid set of claim 7, further comprising a fixer fluid comprising a cationic polymer.

11. A printing system, comprising:
a vinyl print medium;
an inkjet printhead in fluid communication with a reservoir containing a UV-curable inkjet ink, and which is positioned to jet the UV-curable inkjet ink onto the vinyl print medium, wherein the ink comprises:
water,
a pigment,
a photo-initiator,
from 8 wt % to 25 wt % organic co-solvent, and
from 2 wt % to 20 wt % polyurethane dispersed therein; and
a UV curing lamp positioned to cure the UV-curable inkjet ink on the vinyl print medium;
wherein the polyurethane dispersion comprises a polymer strand comprising a polymer backbone having two ends terminating at a first capping unit and a second capping unit, wherein the polymer backbone comprises polymerized monomers including:
a diisocyanate, and
a reactive diol selected from:

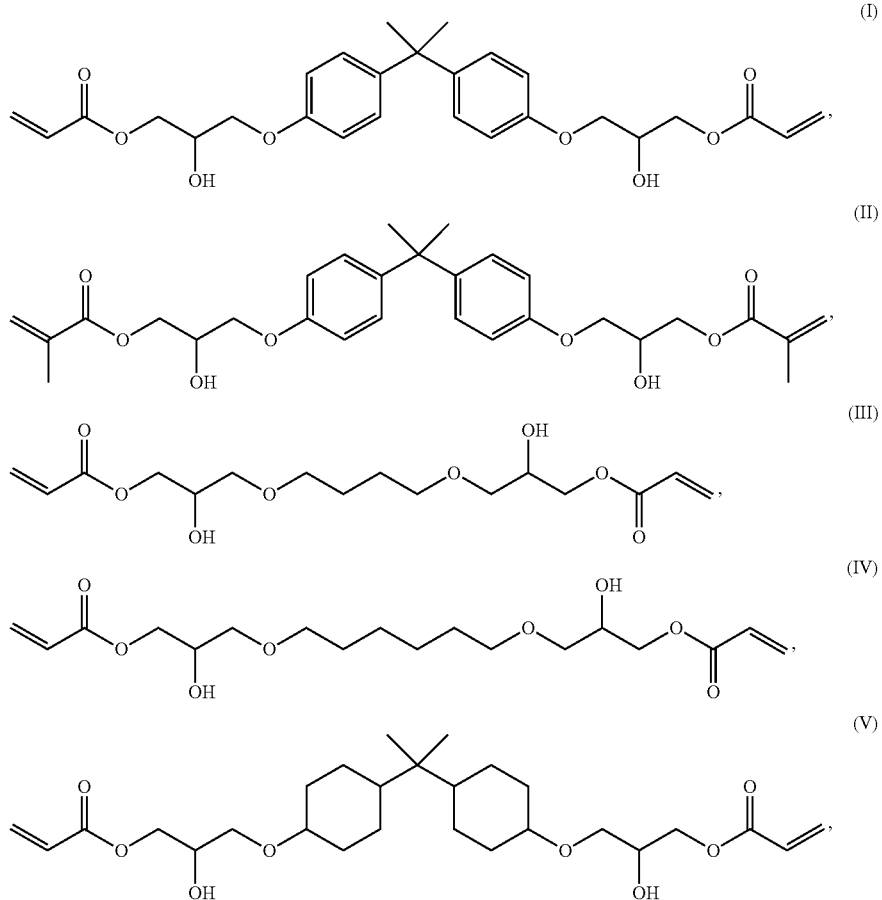

-continued

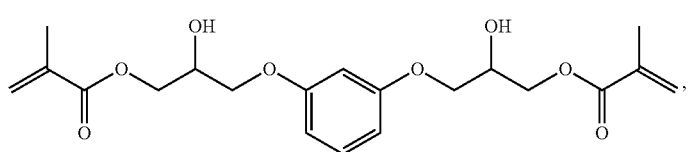

(VI)

or a combination thereof;
wherein the first capping unit comprises a monoalcohol or a monoamine reacted with an isocyanate group of the diisocyanate, and which is selected from an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol; and
wherein the second capping unit comprises 3-(cyclohexylamino)-1-propanesulfonic acid or 2-(cyclohexylamino)ethanesulfonic acid reacted with an isocyanate group of the diisocyanate.

12. The printing system of claim 11, further comprising a UV-curable binder fluid applicator in fluid communication with a reservoir of a UV-curable binder fluid, and which is positioned to apply the UV-curable binder fluid over the UV-curable inkjet ink once printed on the vinyl print medium, wherein the UV-curable binder fluid is devoid of pigment and includes from 8 wt % to 30 wt % of the polyurethane dispersed therein, wherein the polyurethane dispersed in the UV-curable binder fluid is at a greater concentration than the polyurethane dispersed in the UV-curable inkjet ink.

13. The printing system of claim 11, further comprising a fixer fluid applicator in fluid communication with a reservoir of a fixer fluid and positioned to apply the fixer fluid to the vinyl print medium before the UV-curable inkjet ink is jetted onto the vinyl print medium, wherein the fixer fluid comprises a cationic polymer.

14. The printing system of claim 11, wherein the system is a page-wide high speed inkjet printer adapted to print a page width of 30 cm to 250 cm at a speed from 100 feet per minute to 1,000 feet per minute.

* * * * *